US010906027B2

(12) United States Patent
Donet et al.

(10) Patent No.: US 10,906,027 B2
(45) Date of Patent: Feb. 2, 2021

(54) CATALYTIC MODULE

(71) Applicant: COMMISSARIAT A L'ENERGIE ATOMIQUE ET AUX ENERGIES ALTERNATIVES, Paris (FR)

(72) Inventors: Sebastien Donet, Meaudre (FR); Christelle Anglade, Saint-Pierre-de-Mesage (FR); Thierry Krebs, Le Versoud (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 581 days.

(21) Appl. No.: 15/513,812

(22) PCT Filed: Sep. 22, 2015

(86) PCT No.: PCT/EP2015/071663
§ 371 (c)(1),
(2) Date: Mar. 23, 2017

(87) PCT Pub. No.: WO2016/046169
PCT Pub. Date: Mar. 31, 2016

(65) Prior Publication Data
US 2018/0221857 A1    Aug. 9, 2018

(30) Foreign Application Priority Data

Sep. 24, 2014 (FR) .................................... 14 59025

(51) Int. Cl.
| | |
|---|---|
| *B01J 23/63* | (2006.01) |
| *B01J 37/02* | (2006.01) |
| *B01J 35/04* | (2006.01) |
| *B01D 53/94* | (2006.01) |
| *F01N 3/28* | (2006.01) |
| *F01N 3/08* | (2006.01) |
| *B01J 35/10* | (2006.01) |

(52) U.S. Cl.
CPC .............. *B01J 23/63* (2013.01); *B01J 35/04* (2013.01); *B01J 37/0215* (2013.01); *B01D 53/945* (2013.01); *B01D 2255/1021* (2013.01); *B01D 2255/1023* (2013.01); *B01D 2255/1025* (2013.01); *B01D 2255/2065* (2013.01); *B01D 2255/20715* (2013.01); *B01D 2255/50* (2013.01); *B01D 2255/902* (2013.01); *B01D 2255/9022* (2013.01); *B01D 2255/9025* (2013.01); *B01D 2255/9027* (2013.01); *B01D 2258/01* (2013.01); *B01D 2258/012* (2013.01); *B01J 35/108* (2013.01); *F01N 3/08* (2013.01); *F01N 3/2803* (2013.01); *F01N 2330/06* (2013.01); *F01N 2370/02* (2013.01); *Y02T 10/12* (2013.01)

(58) Field of Classification Search
CPC .............................. B01J 23/63; B01J 37/0215
USPC ........................................................ 502/304
See application file for complete search history.

(56) References Cited

U.S. PATENT DOCUMENTS

| | | |
|---|---|---|
| 9,433,927 B2 | 9/2016 | Ikeda et al. |
| 2003/0007904 A1 | 1/2003 | Tonkovich et al. |
| 2004/0198592 A1 | 10/2004 | Hu et al. |
| 2010/0143608 A1 | 6/2010 | Ruiz et al. |
| 2014/0248208 A1* | 9/2014 | Schmidt ............... B01J 35/0006 423/502 |

FOREIGN PATENT DOCUMENTS

| | | |
|---|---|---|
| CN | 1400923 A | 3/2003 |
| CN | 1445014 A | 10/2003 |
| CN | 1472008 A | 2/2004 |
| CN | 101688298 A | 3/2010 |
| CN | 101784695 A | 7/2010 |
| CN | 102947944 A | 2/2013 |
| CN | 103889568 A | 6/2014 |
| JP | 2010-526650 A | 8/2010 |
| WO | WO 2004/091765 A2 | 10/2004 |
| WO | WO 2006/070130 A2 | 7/2006 |
| WO | WO 2007/088292 A1 | 8/2007 |
| WO | WO 2008/133444 A2 | 11/2008 |
| WO | WO 2014/119749 A1 | 8/2014 |

OTHER PUBLICATIONS

International Search Report dated Dec. 11, 2015 in PCT/EP2015/071663.
Kimberly D. Pollard, et al., "Chemical Vapor Deposition of Cerium Oxide Using the Precursors [Ce(hfac)$_3$(glyme)]" Chemistry of Materials, vol. 12, No. 3, XP055159231, Mar. 1, 2000, pp. 701-710.
Danan Dou, et al., "Investigation of NOx Adsorber Catalyst Deactivation" SAE Technical Papers Series No. 982594, 1998, pp. 1-14 and cover pages.
U.S. Appl. No. 14/375,545, filed Jul. 30, 2014, US 2014/0377650 A1, Pascal Tiouet, et al.
Combined Chinese Office Action and Search Report dated Apr. 1, 2019 in Patent Application No. 201580051525.0 (with unedited computer generated English translation of Office Action and English Translation of Category of Cited Documents), citing documents AA and AO-AP therein, 18 pages.
Office Action dated Jul. 30, 2019 in Japanese Patent Application No. 2017-515946, citing documents AO and AP therein, 21 pages (with English translation).
Office Action dated Sep. 8, 2020 in Chinese Patent Application No. 201580051525.0.

* cited by examiner

*Primary Examiner* — Edward M Johnson
(74) *Attorney, Agent, or Firm* — Oblon, McClelland, Maier & Neustadt, L.L.P.

(57) ABSTRACT

The invention relates to a catalytic module including a solid support and a stack including at least the following layers arranged in the following order, taking the solid support as a base: a first porous layer containing $CeO_2$ and deposited by chemical vapour deposition, and a first catalytic layer containing at least one metal and/or at least one alloy of metals.

20 Claims, 2 Drawing Sheets

CATALYTIC MODULE

TECHNICAL DOMAIN AND STATE OF PRIOR ART

This invention relates to a catalytic module with improved effectiveness in terms of ageing.

In the automobile industry Metallic catalysts, for example Rhodium, are used to reduce nitrogen oxides NOx, and Platinum and Palladium for oxidation of CO and hydrocarbons. These catalysts are deposited on a structure for example made of honeycomb that is subsequently installed in the exhaust line.

The structure, for example made of ceramic, is covered with a buffer layer usually called a "washcoat" to give an increased specific surface that is subsequently covered with precious materials such as Pt, Pd and Rh.

The catalytic module is place in the exhaust line and is subjected to very high temperatures, for example more than 600° C., this high temperature tends to reduce the active surface area of catalysts and their performances are degraded. The high temperature tends to reduce dispersion of the washcoat and catalyst pair by sintering. An increase in the size of catalyst particles is observed due to the coalescence phenomenon as described in the document by D. Dou, O. H. Bailey, SAE Technical Papers Series No. 982594 (1998).

Furthermore, catalytic modules use precious metals, such that they are expensive. For example, the precious metals are deposited at the same time as the washcoat by impregnation, and the quantity of precious metals is then large.

PRESENTATION OF THE INVENTION

Consequently, one purpose of this invention is to provide a high performance catalytic module with better effectiveness during ageing than existing modules.

Another purpose of this invention is to provide a module for which the quantity of precious metals used in manufacturing is lower than in modules according to the state-of-the-art, but for which the effectiveness is similar.

The above-mentioned purpose is achieved by using a catalytic module comprising a support, at least one layer containing ceria, the layer being deposited by Chemical Vapour Deposition (CVD) and at least one layer of precious metal or precious metals forming the catalyst, said catalyst layer being deposited by CVD.

The inventors have discovered that by depositing the layer containing ceria by CVD and the catalyst layer by CVD, strong bonds developed between ceria and the particles of precious metals, which had the effect of reducing coalescence at high temperature, and that in reducing this coalescence, the reactive area of the catalyst layer remains high and the effectiveness of the module remains good even after ageing.

The effectiveness of the module is determined by measuring the temperature of the module at which half the pollutant to be treated (for example CO) has disappeared, both for a new module and for an aged module.

The temperatures of modules according to the invention are similar to temperatures in modules according to the state-of-the-art, while using a substantially lower quantity of precious metals during their manufacture. This is made possible by the use of a layer formed by CVD containing ceria as the support for the layer of precious metal or precious metals also formed by CVD.

In one advantageous example, a buffer layer also called a "washcoat" is formed between the support and the layer containing resin, this washcoat having the effect of increasing the reaction surface area of the catalytic layer.

In one particularly advantageous embodiment, the layer containing ceria forms the washcoat that is therefore deposited by chemical vapour deposition and not by liquid impregnation. The number of layers is then reduced. Moreover, all the layers are made by CVD, reducing the manufacturing complexity of the module.

The layer containing ceria may also comprise zirconia or yttriated zirconia that has the advantage of forming a thermal shield for the washcoat.

Advantageously, an additional layer containing ceria can be formed on the catalyst layer, encapsulating the catalyst.

Very advantageously, the structure is made at least partly by chemical vapour deposition, which makes it possible to reduce the quantity of raw material used and particularly the quantity of precious metals. The manufacturing cost is then reduced, while providing comparable efficiency.

The subject-matter of the present invention is then a catalytic module comprising a solid support, and a stack comprising at least the following layers, arranged in order starting from the solid support: a first porous layer containing $CeO_2$ deposited by chemical vapour deposition, a first catalytic layer containing one or more metals and/or one or more alloys of metals among Pt, Pd, Rh.

The first layer containing CeO2 is discontinuous and comprises islands with a size preferably between a few nm and 100 nm.

The catalytic module can comprise a second porous layer containing $CeO_2$ formed on the first catalytic layer. This catalytic module can advantageously comprise a second catalytic layer formed on the second porous layer containing $CeO_2$.

According to another characteristic, the catalytic module may comprise a buffer layer containing one or several metal oxides called "washcoats" between the solid support and the first porous layer containing $CeO_2$.

For example, the buffer layer comprises one or several mixed oxides of different natures such as $Al_2O_3$, $CeO_2$—$ZrO_2$, $BaO_2$, zeolite, $TiO_2/V_2O_5$.

In one example embodiment, the first porous layer containing $CeO_2$ can form the washcoat.

In one example embodiment, the first and/or the second porous layer containing $CeO_2$ comprises principally $CeO_2$.

In another example embodiment, the first and/or the second porous layer containing $CeO_2$ also comprises zirconia.

In another example embodiment, the first and/or the second porous layer containing $CeO_2$ also comprises yttriated zirconia.

The solid support may be a macroporous support, for example a foam or a honeycomb structure, the solid support for example being made of ceramic, for example from mullite or cordierite, or it may be metal.

Another subject-matter of the invention is a method of making a catalytic module according to the invention, including steps to form on the solid support:

a) a first porous layer containing $CeO_2$ formed by chemical vapour deposition, b) a first catalytic layer formed by chemical vapour deposition, Steps a) and/or b) are preferably done by MOCVD.

The method may include a step in which a buffer layer containing one or several metal oxides is formed prior to step a), for example by liquid impregnation.

According to another characteristic, the method may include a step c) in which a second layer containing $CeO_2$ is formed on the first catalytic layer.

According to another characteristic, the method may include a step d) in which a second catalytic layer is formed on the second layer containing $CeO_2$.

According to another characteristic, the method includes a heat treatment step after step b) conducive to the development of strong bonds between the $CeO_2$ and the precious metals.

BRIEF DESCRIPTION OF THE DRAWINGS

This invention will be better understood after reading the following description and the appended drawings on which.

DETAILED PRESENTATION OF PARTICULAR EMBODIMENTS

Figure 1:
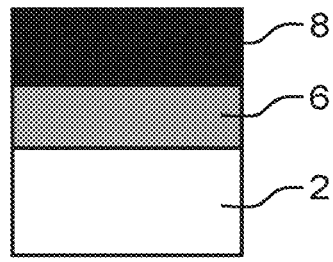
FIG. 1 shows a diagrammatic sectional view of a first embodiment of a catalytic module.

FIG. 1 shows a diagrammatic sectional view of a zone of a first embodiment of a catalytic module according to the invention.

The module comprises a solid support structure 2.

The support structure is advantageously macroporous.

A "macroporous support structure" means for example foams such as ceramic foams with a porosity from a few ppi to several tens of ppi (pores par inch), and/or honeycomb structure supports from a few cpsi (channels per square inch) to several hundred cpsi. The solid support may be composed of a material chosen from among ceramics, for example cordierite or mullite; metals and metallic alloys such as steel or FeCrAl; polymers; zeolites; silicon; glass; fabrics; and composite materials containing several of the above-mentioned materials.

In the represented embodiment and advantageously, the module also comprises at least one layer containing ceria 6 and a layer of catalysts 8.

The layer 6 may be formed from ceria, ceria and zirconia, ceria and yttriated zirconia for example in the ratios 50/50 or 50/80. The layer 6 is porous. The yttriated zirconia may for example be doped to between 5% and 30%.

The layer 6 containing ceria is formed on the support structure by chemical vapour deposition, preferably by "Organometallic Chemical Vapour Deposition" (OMCVD). For example, the ceria layer is obtained by DLI-MOCVD using the Ce(AcAc)2 precursor diluted in ortho-xylene, according to a technique well known to a person skilled in the art. The ceria layer thus formed can be continuous or discontinuous, the ceria layer being thin, for example it may be between 50 nm and 100 nm thick, and it is sensitive to the surface condition of the support layer on which it is formed. If the support layer is heterogeneous, the ceria layer can be discontinuous.

The ceria layer deposited by CVD that is discontinuous forms dispersed islands on which the precious metal(s), for example among platinum, palladium or rhodium and/or a combination of these metals, is (are) deposited. The size of these ceria islands is advantageously between a few nm and 100 nm.

The CVD deposition enables efficient impregnation of the support structure that is macroporous and leads to the deposition of layers with a homogeneous thickness and structure.

The catalyst layer 8 comprises one or several precious metals for example from among platinum, palladium and rhodium and/or a combination of these metals.

The composition of the catalytic layer depends on the required application.

For example, in the case of an application to depollution of exhaust gases from diesel engines containing carbon monoxide CO and unburned hydrocarbons, the catalytic layer is of the PtPdM type, where M is chosen from among Sr, Cu, Fe, etc.

In the case of an application to depollution by oxidoreduction of exhaust gases from petrol engines containing carbon monoxide CO, unburned hydrocarbons and NOx, the catalytic layer is of the PtRhM type, where M is chosen from among Sr, Cu, Fe, etc.

In the case of an application to depollution by reduction of NOx, the catalytic layer is of the PtPdRhM type, where M is chosen from among Sr, Cu, Fe, etc.

The catalytic layer is formed by chemical vapour deposition, advantageously by organometallic chemical vapour deposition.

The most frequently used precursors are beta-diketones. Thus, Pt(acac) is dissolved for example in toluene, Pd(acac) is dissolved for example in toluene and Rh(acac) is dissolved for example in toluene.

The catalytic layer is formed from particles distributed on the ceria layer 6 forming a discontinuous layer in the form of islands and that is porous with a large reactive surface area.

The inventors have observed that the layer 6, and particularly ceria, deposited by CVD formed strong bonds with particles of the precious metal(s) deposited by CVD. These strong bonds limit or even prevent the coalescence of precious metal particles, limiting the reduction in the effectiveness of the catalytic module. These bonds are known as Strong Metal Support Interactions (SMSI).

Advantageously, the layer 6 can form the washcoat, for example it can be composed of mixed oxide compounds $Ce_xZr_{1-x}O_2$, for example $CeO_2$—$ZrO_2$.

Therefore the layer 6 can act as a washcoat and also provide a large specific surface, increasing the reactive surface area of the catalytic layer.

Figure 2:
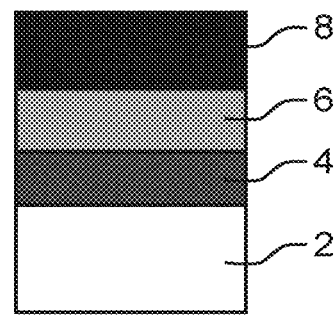
FIG. 2 shows a diagrammatic sectional view of a first example of a second embodiment of a catalytic module.

In another embodiment shown on FIG. 2, the module comprises a distinct washcoat 4 that for example can include one or several oxides of different natures, such as $Al_2O_3$, mixed oxide compounds $Ce_xZr_{1-x}O_2$, for example $CeO_2$—$ZrO_2$, $BaO_2$, zeolite, $TiO_2/V_2O_5$ . . . so as to increase the specific surface of the part. For example, the washcoat 4 may be made by liquid impregnation.

On FIG. 2, the layer 6 containing ceria is deposited on the washcoat by CVD.

The layer 6 can have the same composition as that described with reference to FIG. 1. In this embodiment, a layer 6 containing zirconia or yttriated zirconia is particularly advantageous, because the layer 6 forms a thermal shield for the washcoat so that it can keep its large specific surface. For example, each layer may be between 10 nm et 100 nm thick.

For example, the support structure may be 1000 µm thick, the washcoat 10 µm thick, the layer 6 may be 50 nm thick and the catalytic layer 10 nm thick.

The catalytic layer is formed from particles distributed on the bond layer 6 forming a discontinuous layer with a large reactive surface, increased due to the specific surface of the washcoat.

Figure 3:
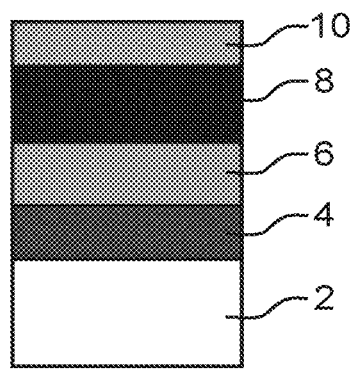
FIG. 3 shows a diagrammatic sectional view of a second example of a second embodiment of a catalytic module.

On FIG. 3, there is another example embodiment of a catalytic module comprising a heterostructure including a layer 10 containing ceria on the catalytic layer 8, that is not in the structure in FIG. 2. This layer forms an encapsulation layer for the precious metals. This layer 10 is preferably made by CVD.

The composition of the layer 10 may be the same as the layer 6 or it may have a different composition. The layer 10 is porous so that the gases to be treated can access the catalytic layer. The presence of zirconia or yttriated zirconia in the layer 10 makes it possible for the layer 10 to form a thermal shield. The catalyst will then be more stable and have better resistance to heat.

For example the thicknesses of the layers 2, 4, 6, 8 are the same as the thicknesses of the layers in the module in FIG. 1, and for example the layer 10 may be 50 nm thick.

Figure 4:
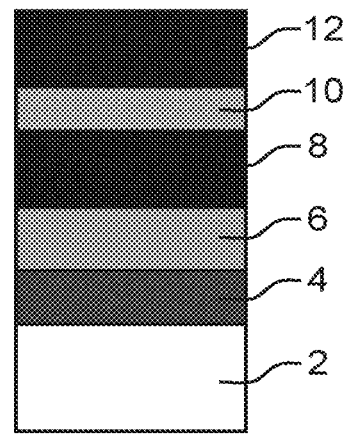
FIG. 4 shows a diagrammatic sectional view of a third example of a second embodiment of a catalytic module.

FIG. 4 shows another particularly advantageous example embodiment of a catalytic module, comprising a heterostructure including a second catalytic layer 12 on the layer 10 containing ceria. In this case, the layer 10 and the layer 12 are preferably both made by CVD, and strong bonds then develop between layers 10 and 12. This arrangement can increase the density of precious metals for a given support structure. This example embodiment is particularly very advantageous in a application for depollution of engines running on natural gas to eliminate methane.

The composition of the second catalytic layer 12 can be identical to or different from the composition of the first catalytic layer 6.

For example the thicknesses of the layers 2, 4, 6, 8, 10 are the same as the thicknesses of the layers of the module in FIG. 1, and for example the catalytic layer 12 may be 10 nm thick.

In the given examples, the two layers 6, 10 have the same thickness and the catalytic layers 8, 12 have the same thicknesses, but this is in no way limitative.

It will be understood that the number of layers containing ceria and the number of catalytic layers are not limited to two.

The layer of YSZ can be deposited by MOCVD starting from a chemical solution containing from 5 to 30% by mass of Y(acac) mixed with Zr(acac) in Xylene.

Moreover, a stack comprising one or several layers between the porous structure and the washcoat made by CVD or by liquid phase impregnation is within the scope of this invention.

We will now describe a method of making a catalytic module according to FIG. 2.

During a first step, the support structure is made by extrusion of a ceramic paste and then shaping according to normal techniques used by a person skilled in the art.

In the next step, the washcoat 4 is formed on the support structure for example using an impregnation technique by which the precursors in liquid form are forced to flow through the part.

Alternatively, the washcoat can be made by "Organometallic Chemical Vapour Deposition" (OMCVD). As mentioned above, the washcoat can comprise for example one or several mixed oxides of different natures such as $Al_2O_3$, $CeO_2$—$ZrO_2$, $BaO_2$, zeolite, $TiO_2/V_2O_5$.

In a next step, the layer containing ceria is made, for example by CVD, and very advantageously by Direct Liquid Injection Metal Organic Chemical Vapour Deposition (DLI-MOCVD).

In a next step, the catalytic layer is formed by CVD, advantageously by metal organic chemical vapour deposition.

The most frequently used precursors for making parts of which part of the surface is covered with one or several catalysts for the treatment of exhaust gases, are beta-diketones. Thus, Pt(acac), Pd(acac) and Rh(acac) are dissolved for example in toluene.

In the case of a PtPdM type catalytic layer in which M is chosen from among Sr, Cu, Fe . . . Sr, Cu, Fe are introduced for example in co-elution in solution with catalysts with beta-diketonates of Sr, Cu or Fe.

The precursor(s) in liquid form is (are) vaporised and injected into the MOCVD chamber in which the support structure is covered by the washcoat and the layer containing ceria.

A heat treatment is then advantageously applied to facilitate the development of strong bonds between ceria and the precious metals. For example, the heat treatment takes place under air for 1 to 4 hours, for example for 2 hours at between 500° C. and 800° C.

Production of the different layers by CVD has the advantage that all layers of the module can be made in the same MOCVD chamber.

Figure 5:
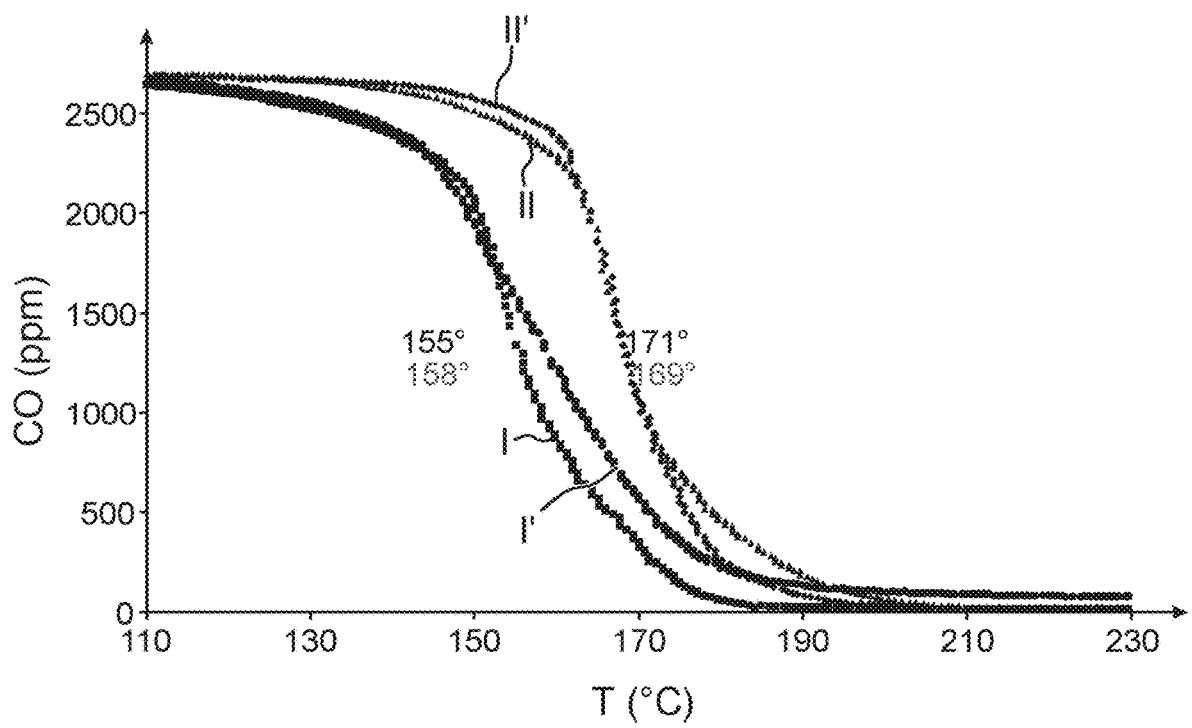
FIG. 5 shows a graph illustrating the variation in the content of CO (en ppm) in the gas mixture to be treated as a function of the temperature for the fresh and aged catalytic module shown in FIG. 2 and for a fresh and aged catalytic module according to the state of the art.

Moreover, the use of chemical vapour deposition can lead to a large reduction in the mass of precious metal used in the manufacturing process while maintaining practically the same effectiveness, as illustrated in the curve in FIG. 5 that represents the light-off curve of CO, i.e. the variation in the content of CO (in ppm) in the gas mix to be treated as a function of the temperature of the catalytic module.

Moreover, the deposition of the layer containing ceria by DLI-MOCVD causes a reduction in intrinsic stresses and stresses at interfaces.

Thus, stresses within the heterostructure can be reduced by the adaptation of mesh parameters and expansion coefficients due to the production of crystallographically oriented multi-layers so that better densification of the stack is possible by matching mesh and thermal expansion parameters.

Controlling parameters of the deposition process makes it possible to module the morphology of grains, the crystallographic structure of deposited materials and their dispersion.

Curves I and II apply to the new and aged M2 modules in FIG. 2 using 0.92 g/l (26 g/ft$^3$) of precious metal during production.

Curves I' and II' correspond to a catalytic module M1 according to the state of the art in the new and aged states respectively, comprising a washcoat and particles of precious metals, in which the particles of precious metals are immersed and deposited by impregnation, using 3 g/l (85 g/ft$^3$) of precious metals for its production.

For a new module, the 50% reduction of the content of CO initially contained in the gas mixture is achieved for a temperature of 155° C. for module M2 and 158° C. for module M1, while this reduction with an aged module is achieved at 171° C. for module M2 and 168° C. for module M1. Therefore since the precision is +/−3° C., it can be seen that the effectiveness of the two modules is very similar. Due to the invention and use of the layer containing ceria, the effectiveness remains almost unchanged although the quantity of precious metals used in the method is very significantly reduced. Therefore the mass of precious metals can be reduced by a factor of about 3 without affecting the effectiveness.

The following table shows temperatures necessary to eliminate 50% of CO for new and for aged modules.

| Module | T° (C.) for new module | T° (C.) for aged module |
|---|---|---|
| M1 | 158 | 169 |
| M2 | 155 | 171 |
| M3 | 160 | 179 |
| M4 | 178 | 188 |
| M5 | 150-149 | 183 |
| M6 | 131-145 | 182 |
| M7 | 144 | 171 |

M3 corresponds to the module in FIG. 2, layer 6 containing 80% of ceria and 20% of zirconia and layer 8 containing Pt and Pd.

M4 corresponds to the module in FIG. 2, layer 6 containing 50% of ceria and 50% of zirconia and layer 8 containing Pt and Pd.

M5 corresponds to the module in FIG. 3, layers 6 and 10 being ceria and layer 8 containing Pt and Pd.

M7 corresponds to the module in FIG. 3, layers 6 and 10 containing 80% of ceria and 20% of zirconia and layer 8 containing Pt and Pd.

M6 corresponds to the module in FIG. 4, layers 6 and 10 being ceria and the catalytic layers 8 and 12 being Pt and Pd.

M7 corresponds to the module in FIG. 2 produced by CVD containing 1.25 g/l (35 g/ft$^3$) of precious metals.

A difference of not more than 10° C. from the temperatures of M1 is considered to be acceptable.

In general, it is seen that temperatures at 50% of CO for aged models according to the invention are of the order of 10° C. higher than for M1. But modules according to the invention were fabricated with 0.92 g/l (26 g/ft$^3$) of precious metals while the module according to the state of the art was fabricated with 3 g/l (85 g/ft$^3$) of precious metals and temperatures are similar. Aged modules have temperatures of the order of 180° C. that are acceptable. The presence of the coat containing ceria reduces coalescence and makes it possible to maintain the effectiveness of the module in the long term, while using a lower quantity of precious metals than in the state of the art.

It can be seen that the higher quantity of precious materials used during the manufacturing process for module M7 than for module M2 ((1.23 g/l 35 g/ft$^3$ instead of 0.92 g/l (26 g/ft$^3$)) makes it possible to reduce the temperature for a new model to 141° C. instead of 155° C.

Moreover, it can be seen that the new modules M5, M6 and M7 have a lower temperature for elimination of 50% of CO than module M1 according to the state of the art, which is very good for maintaining the effectiveness of the modules and for a fast start of depollution.

The module according to the invention is particularly well adapted for manufacturing of depollution modules for automobiles for the elimination of CO, NOx and soot, for air treatment modules for example for the treatment of VOCs and NOx, for manufacturing of modules for the production of hydrogen by reforming and for manufacturing hydrogen storage modules.

The invention claimed is:

1. A catalytic module, comprising:
   a solid support; and
   a stack comprising at least the following layers arranged in the following order, starting from the solid support:
      a first porous layer comprising $CeO_2$ and deposited by chemical vapour deposition, and
      a first catalytic layer comprising at least one metal and/or at least one alloy of metals selected from the group consisting of Pt, Pd, and Rh, said first catalytic layer being deposited on the first porous layer by chemical vapour deposition.

2. The catalytic module according to claim 1, wherein the first layer comprising $CeO_2$ is discontinuous and comprises islands.

3. The catalytic module according to claim 1, comprising a second porous layer comprising $CeO_2$ formed on the first catalytic layer.

4. The catalytic module according to claim 3, comprising a second catalytic layer formed on the second porous layer comprising $CeO_2$.

5. The catalytic module according to claim 1, comprising a buffer layer between the solid support and the first porous layer comprising $CeO_2$, said buffer layer comprising at least one metal oxide.

6. The catalytic module according to claim 5, wherein the buffer layer comprises one or several mixed oxides of different natures.

7. The catalytic module according to claim 1, wherein the first porous layer comprising $CeO_2$ forms a buffer layer.

8. The catalytic module according to claim 1, wherein the first and/or the second porous layer comprising $CeO_2$ comprises mainly $CeO_2$.

9. The catalytic module according to claim 1, wherein the first and/or the second porous layer comprising $CeO_2$ further comprises zirconia.

10. The catalytic module according to claim 1, wherein the first and/or the second porous layer comprising $CeO_2$ further comprises yttriated zirconia.

11. The catalytic module according to claim 1, wherein the solid support is a macroporous support.

12. A method of manufacturing a catalytic module according to claim 1, comprising the following to form a solid support:
   a) forming a first porous layer comprising $CeO_2$ by chemical vapour deposition; and
   b) forming the first catalytic layer comprising at least one metal and/or at least one alloy of metals selected from the group consisting of Pt, Pd, and Rh on the first porous layer by chemical vapour deposition.

13. The method according to claim 12, wherein a) and/or b) are performed by metal organic chemical vapour deposition.

14. The method according to claim 12, further comprising forming a buffer layer comprising at least one metal oxide prior to the forming of the first porous layer a).

15. The method according claim 12, further comprising c) forming a second layer comprising $CeO_2$ on the first catalytic layer.

16. The method according to claim 15, further comprising d) forming a second catalytic layer on the second layer comprising $CeO_2$.

17. The method according to claim 12, comprising performing a heat treatment after b) conducive to development of strong bonds between the ceria and the metals.

18. The catalytic module according to claim 2, wherein the islands have a size between a few nm and 100 nm.

19. The catalytic module according to claim 11, wherein the macroporous support is a foam or a honeycomb structure.

20. The catalytic module according to claim 1, wherein the solid support comprises:
   ceramic, as mullite or cordierite; or
   a metal.

* * * * *